United States Patent

[11] 3,634,090

[72] Inventors Hans-Dieter Frommeld;
Herbert Rauhut, both of Wiesbaden-Biebrich, Germany
[21] Appl. No. 855,423
[22] Filed Sept. 4, 1969
[45] Patented Jan. 11, 1972
[73] Assignee Keuffel & Esser Company
Morristown, N.J.
[32] Priority Sept. 31, 1968
[33] Germany
[31] P 17 93 342.5

[54] LIGHT SENSITIVE ONE-COMPONENT DIAZOTYPE MATERIAL
8 Claims, No Drawings

[52] U.S. Cl............................................. 96/91 R,
260/141
[51] Int. Cl............................................... G03c 1/54,
G03c 5/18
[50] Field of Search............................................ 96/91 R;
260/141

[56] References Cited
UNITED STATES PATENTS

| 3,442,650 | 5/1969 | Hendrickx et al. | 96/91 |
|---|---|---|---|
| 3,459,550 | 8/1969 | Munder et al. | 96/91 |
| 3,459,551 | 8/1969 | Rauhut | 96/91 |
| 3,463,639 | 8/1969 | Baltazzi | 260/141 X |
| 3,493,374 | 2/1970 | Roncken et al. | 96/91 X |
| 3,493,377 | 3/1970 | Rauhut et al. | 96/91 |
| 3,498,790 | 3/1970 | Sus et al. | 260/141 X |
| 3,510,307 | 5/1970 | Borchers et al. | 96/91 X |
| 3,520,692 | 7/1970 | Knoester e al. | 260/141 X |
| 3,525,618 | 7/1970 | Keller et al. | 96/91 X |
| 3,547,637 | 12/1970 | Scheler et al. | 260/141 X |
| 3,560,215 | 2/1971 | Knoester et al. | 260/141 X |
| 3,563,752 | 2/1971 | Werner et al. | 96/91 R |
| 3,573,052 | 3/1971 | Gray et al. | 96/91 R |

*Primary Examiner*—Harold Ansher
*Attorneys*—J. Russel Juten, Peter F. Willig, Lionel N. White and Milford A. Juten

ABSTRACT: Light sensitive diazotype material includes a diazonium compound of the general formula

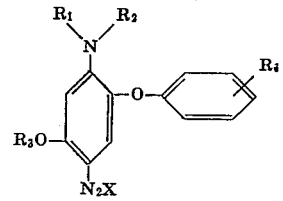

wherein
$R_1$ and $R_2$ alkyl of up to five carbon atoms, aralkyl or cycloalkyl of up of 10 carbon atoms, or together form a five- or six-membered saturated heterocyclic group with the nitrogen atom;
$R_3$ is a halogenalkyl group of up to four carbon atoms containing at least one fluorine atom;
$R_4$ is hydrogen, halogen, or an alkyl, alkoxy, or dialkylamino groups; and
X is the anion of the diazonium compound.

LIGHT SENSITIVE ONE-COMPONENT DIAZOTYPE MATERIAL

BACKGROUND OF THE INVENTION

It is known to use, as light-sensitive substances in photoprinting materials, benzene diazonium compound carrying in 4-position to the diazo group a tertiary amino group which is substituted by alkyl or aralkyl groups or whose nitrogen atom is a component of a heterocyclic radical.

These compounds may contain further substituents in the benzene ring, e.g., halogen atoms or alkyl, alkoxy or phenoxy groups, preferably in 2- or 5-position to the diazo group.

The properties which render these compounds suitable for diazotype purposes are largely determined by these substituents.

Thus, the coupling speed of the diazo compounds is increased by introducing an alkoxy group into the benzene ring in m-position to the diazonium group. It is even more increased by the presence of a phenoxy group in this position. Thus, the 4-dimethylamino-5-phenoxy-benzene diazonium salt, e.g., couples more rapidly than does the 4-dimethylamino-5-methoxy-benzene diazonium salt.

The substitution of a hydrogen atom in o-position to the diazonium group by an alkoxy group improves the stability of the diazonium salts. However, in this case, a certain reduction of the coupling speed caused by the substituent in o-position must be tolerated. On the other hand, rapidly coupling, highly light sensitive, and stable diazo compounds are desirable for one-component diazotype materials.

Diazonium compounds suitable for one-component material are described, e.g., in U.S. Pat. No. 3,397,058. They contain, as the essential feature, a phenoxy group in m-position to the diazonium group and possess high-light sensitivity and coupling speed. However, when these compounds are developed with neutral or weakly acid developer, where a high-coupling activity of the compounds is of particular importance, it becomes apparent that a further improvement of this quality of the compounds would be desirable. U.S. Pat. No. 3,539,347, also describes readily coupling, highly light sensitive diazonium compounds which are substituted in the benzene nucleus by halogen atoms, or alkyl, alkoxy or fluorinated alkoxy groups. These compounds contain no phenoxy groups.

SUMMARY OF THE INVENTION

It is an object of the present invention to provide diazonium compounds which are distinguished by a combination of high-light sensitivity, good stability, and high-coupling speed.

The invention is based on a light sensitive diazonium compound derived from unilaterally diazotized p-phenylene diamine. According to the invention, diazonium compound of the general formula is used

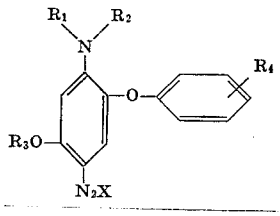

wherein
$R_1$ and $R_2$ are alkyl, aralkyl or cycloalkyl groups or form a heterocyclic radical with the nitrogen atom;
$R_3$ is a halogenalkyl group containing at least one fluorine atom;
$R_4$ is hydrogen, halogen, or an alkyl, alkoxy or dialkylamino group; and
X is the anion of the diazonium compound.

According o the invention, such compounds are preferred in which $R_3$ is a halogenalkyl group containing at least two fluorine atoms at the carbon atom in 1-position, because they have a particularly high-coupling speed.

Further, a one-component diazotype material is provided according to the invention which contains one of the diazonium compounds mentioned as the light sensitive substance.

In special cases, e.g., when they are added to less readily coupling diazo compounds, the compounds according to the present invention may also be used in two-component diazotype materials.

DESCRIPTION OF THE INVENTION

The diazonium compounds to be used according to the invention are distinguished by a coupling speed which is considerably higher than that of compounds containing an unsubstituted alkoxy group instead of the fluorinated alkoxy groups. The compounds according to the invention couple even more rapidly than such known compounds which contain a halogen atom in place of the fluorinated alkoxy group and are known by their particularly high-coupling activity, Surprisingly, the light sensitivity of the novel compounds containing fluorinated alkoxy groups is aLso higher than that of comparable compounds containing unsubstituted alkoxy groups.

Normally, the fluorinated alkoxy radicals contain not more than four carbon atoms, because the compounds become too difficulty soluble with longer carbon fluoride chains. All other substituents attached to the nucleus and to the nitrogen atom are known in the diazotype art and their effect has already been described. Normally, the alkyl radicals in the tertiary amino group contain not more than five carbon atoms; they may be further substituted in known manner, e.g., by halogen, or hydroxy or amino groups, and may have straight or branched chains. The cycloalkyl and aralkyl groups normally contain not more than 10 carbon atoms, substituted or unsubstituted benzyl groups and substituted or unsubstituted cyclohexyl groups being preferred.

When $R_1$ and $R_2$ form a heterocyclic radical with the tertiary nitrogen atom, this radical may be derived in known manner from pyrrolidine, piperidine, piperazine, N-methylpiperazine, thiomorpholine, morpholine,2-methylmorpholine, 2,6-dimethylmorpholine, hexamethyleneimine, or others.

As described in U.S. Pat. No. 3,397,058, the phenoxy group may be substituted by one or more alkyl groups, alkoxy groups, or dialkyl amino groups or by halogen atoms.

The novel diazonium compounds according to the present invention are separated in the customary manner in the form of their salts, e.g., their sulfates, chlorides, tetrafluoborates, or hexafluorophosphates, or in the form of their double or complex salts, e.g., with zinc chloride, cadmium chloride, or tin tetrachloride.

Although the presence of the anions influences the solubility of the diazonium compounds, it has no effect upon their coupling speed or light sensitivity.

The normal supporting materials may be used, such as paper, transparent paper, transparentized paper, cellulose ester films, and plastic films capable of being sensitized with diazo compositions.

The fluorinated alkoxy groups may be introduced in analogy to known methods, e.g., by etherification of appropriately substituted o-nitrophenols with olefins of the type $CF_2=CXY$, wherein X and Y are hydrogen, alkyl or halogen atoms, or by substitution of chlorine, bromine, iodine, or oxygen by fluorine, using, e.g., anhydrous hydrofluoric acid. Reactions of this type are described, e.g., in Houben-Weyl: Methoden der organischen Chemie (Methods of Organic Chemistry), Vol. 5/3, page 280, and Vol. 6/3, page 119.

The following are examples of suitable halogenated alkoxy groups:
—O—$CF_2$H
—$CF_2$Cl
—$CFCL_2$
—$CF_3$
—$CH_2$—$CF_3$
—$CF_2$—CH
—$CF_2$—$CH_2$Cl
—$CF_2$—CHFCl —$CF_2$—$CHFBr$
—$CF_2$—$CHFl$
—$CF_2$—$CHF_2$
—$CF_2$—$CHCl_2$
—$CF_2$—$CHBr_2$
—$CF_2$—$CF_3$
—$CH_2$—$CF_2$—$CF_2H$
—$CF_2$—$CHF$—$CF_3$
—$CF_2$—$CH(CF_3)_2$
—$CF_2$—$CHF$—$CH_2$—$CH_2Br$
—$CF_2$—$CHF$—$CH_2$—$CH_2OH$ In addition to the diazo compounds mentioned in the examples, the following compounds may also be used for the preparation of diazotype material according to the present invention:

The zinc chloride double salt of 4-(N-methyl-N-propylamino)-2-(1', 1'-difluoro-2',2'-dibromo-ethyoxy)-5-(4'-bromo-phenoxy)-benzene diazonium chloride.

4-(N-methyl-N-benzyl-amino)-2-(1', 1'-difluoro-ethoxy)-5-(3'-methyl-phenoxy)-benzene diazonium sulfate.

4-morpholino-2-(1', 1', 2', 2'-tetrafluoro-ethoxy)-5-(4'-methoxy-phenoxy)-benzene diazonium tetrafluoborate.

The tin chloride double salt of 4-piperidino-2-trifluoro-methoxy-5-(2', 4'-dichloro-phenoxy)-benzene diazonium chloride.

Further variations of substituents $R_1$, $R_2$, and $R_4$ are described for similar compounds in the above-mentioned German Pat. No. 1,174,612, e.g.

Of course, the diazotype material according to the invention also may contain mixtures of diazo compounds according to the invention with each other or with other diazo compounds.

The diazonium compounds according to the invention may be prepared by various methods. For instance, 2,5-dichloro-nitrobenzene may be used as the starting product. By reaction with a phenol, which may be substituted, and reduction of the nitro group, a 4-chloro-2-amino-diphenyl-ether is produced the amino group of which is then aralkylated and/or alkylated. During subsequent nitration, the nitro group assumes the 5-position. The chlorine in o-position to the nitro group is split off by means of alkali and the substituted o-nitrophenol produced in this manner is then etherified by the addition of a 1,1-difluoro-alkene-(1). Reduction of the nitro group, diazotization of the amine, and separation of the diazo compound are performed by known methods.

EXAMPLE 1

Photoprinting base paper customarily used for diazotype purposes was coated with aqueous solutions which contained, per 100 ml. of solution:

Test 1a:
  0.5 g. of citric acid
  0.3 g. of gum arabic
  2.0 g. of 4-dimethylamino-2-(1', 1', 2'-trifluoro-2'-chloro-ethoxy)-5-(4'-chloro-phenoxy)-benzene-diazonium sulfate Test 1b:
  0.5 g. of citric acid
  0.3 g. of gum arabic
  2.1 of 4-dimethylamino-2-(1', 1'-difluoro-2', 2'-dichloro-ethoxy)-5-(4'-chloro-phenoxy)-benezene diazonium sulfate Test 1c:
  0.5 g. of citric acid
  0.3 g. of gum arabic
  1.6 g. of the zinc chloride double salt of 4-dimethyl-amino-2-chloro-5-(4'-chloro-phenoxy)-benzene-diazonium chloride. and then dried. Test 1c, which corresponds to the present state of the art, was made for the purpose of comparison.

The sensitized photoprinting materials were imagewise exposed under a transparent original and developed with an aqueous developer solution which contained, per 100 ml. of solution:
  0.33 g. of phloroglucinol
  9.6 g. of trisodium citrate
  2.42 g. of sodium benzoate
  1.97 g. of adipic acid
  5.7 g. of common salt
  0.2 g. of the sodium salt of a dialkyl-naphthalene sulfonic acid and had a pH-value of about 6.

Shortly after the application of the developer solution, black images appeared on a white background.

In order to compare the coupling speeds of the different materials, the copies were subjected to an overall exposure 15 and 30 seconds, respectively, after the developer had been applied, and the optical density of the full color areas was then compared with that of completely developed material. The values stated in the following table are percentages of the maximum optical density attainable in each case:

| Test | after 15 seconds | after 30 seconds |
| --- | --- | --- |
| 1a | 87.2 | 92.6 |
| 1b | 87.7 | 92.2 |
| 1c | 83.7 | 88.6 |

The diazo compounds used in this example were prepared as follows:

4-dimethylamino-2-chloro-5-(4'-chloro-phenoxy)-nitrobenzene was heated in 70 percent aqueous glycol monomethyl ether in the presence of potassium hydroxide. After cooling and neutralization, the 4-dimethylamino-2-hydroxy-5-(4'-chloro-phenoxy-nitrobenzene (melting point 97° C.) was obtained. This compound was heated with 1,1-difluoro-2,2-dichloro-ethylene in 80 percent aqueous acetone in the presence of potassium hydroxide. After cooling, water was added. The crystalline 4-dimethylamino-2-(1', 1'difluoro-2', 2'-dichloroethoxy)-5-(4'-chloro-phenoxy)-nitrobenzene (melting point 102° C.) which formed was then catalytically reduced and the amine was diazotized in sulfuric acid.

Using 1,1,2-trifluoro-2-chloro-ethylene, the 4-dimethylamino-2-(1', 1', 2'-trifluoro-2'-chloro-ethoxy)-5-(4'-chloro-phenoxy)-nitrobenzene (melting point 72° C.) was analogously produced, which was then converted into the corresponding diazo compound as described above.

Equally good results were obtained when using 1.9 g. of 4-dimethyl-amino-2-(1', 1', 2', 2'-tetrafluoro-ethoxy)-5-(4'-chloro-phenoxy)-benzene diazonium sulfate in an analogous solution (melting point of the nitro compound: 113° C.).

Owing to its low-coupling speed, the 4-dimethylamino-2-ethoxy-5-(4'-chloro-phenoxy)-benzene diazonium sulfate which resembles the compounds according to the invention, is unsuitable for one-component diazotype material to be developed with the weakly acid developer solution described above.

EXAMPLE 2

A photoprinting base paper customarily used for diazotype purposes, which was provided on one side with a precoat of finely divided silica and polyvinyl acetate, was coated on its precoated side with an aqueous solution which contained, per 100 ml. of solution,
  0.6 g. of tartaric acid
  0.02 g. of saponin, and
  2.0 g. of 4-dimethylamino-2-(1', 1', 2'-trifluoro-2'-chloro-ethoxy)-5-(4'-methoxy-phenoxy)- benzene diazonium sulfate.

The sensitized photoprinting material was imagewise exposed under a transparent original and then developed with a solution containing, per 100 ml. of solution:

2.5 g. of borax
3.0 g. of soda
2.0 of common salt
5.0 g. of thiourea
0.1 g. of the sodium salt of isopropyl-naphthalene sulfonic acid
0.6 g. of resorcinol, and
0.6 of phloroglucinol Brownish-black images of very good contrast were obtained.

The full color shade obtainable by coupling was produced immediately after application of the developer.

The 4-dimethylamino-2-(1', 1', 2'-trifluoro-2'-chloro-ethoxy)-5-(4'-methoxy-phenoxy)-benzene diazonium sulfate was prepared analogously to the compounds mentioned in example 1. (The nitro compound melts at 87° C.).

Similar results were obtained when using equivalent quantities of 4-dimethylamino-2-(1', 1', 2'-trifluro-2'-bromo-ethoxy)-5-(4'-chloro-phenoxy)-benzene diazonium chloride (melting point of the nitro compound 76° C.) or 4-diethylamine-2-(1', 1', 2'-trifluoro-2'-chloro-ethoxy)-5-(4'chloro-phenoxy)-benzene diazonium chloride (melting point of the nitro compound 102° C.)

EXAMPLE 3

Diazotype material was prepared as described in example 2, using, however, 1.9 g. of 4-dimethylamino-2-(2', 2', 2'-trifluoro-ethoxy)-5-(4'chloro-phenoxy)-benzene diazonium sulfate (melting point of the nitro compound 118° C.) instead of the diazo compound used in example 2. The material thus produced was distinctly more light-sensitive than a corresponding material containing an equivalent quantity of 4-dimethylamino-2-ethoxy-5-(4'-chloro-phenoxy)-benezene diazonium sulfate as the light-sensitive substance.

The above examples have been presented for the purpose of illustration and should not be taken to limit the scope of the present invention. It will be apparent that the described examples are capable of many variations and modifications which are likewise to be included within the scope of the present invention as set forth in the appended claims.

What is claimed is:

1. Light sensitive diazonium compound of the general formula

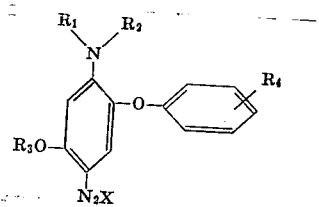

wherein $R_1$ and $R_2$ are alkyl groups of up to five carbon atoms, aralkyl or cycloalkyl groups of up to 10 carbon atoms, or together form a 5- or 6-membered saturated heterocyclic radical with the nitrogen atom;

$R_3$ is a halogenalkyl group of up to four carbon atoms containing at least one fluorine atom;

$R_4$ is hydrogen, halogen, or an alkyl, alkoxy, or dialkylamino group; and

X is the anion of the diazonium compound.

2. Diazonium compound according to claim 1 wherein $R_3$ is a halogen alkyl group containing at least two fluorine atoms at the carbon atom in 1-position.

3. Light sensitive diazotype material comprising a supported layer of a composition comprising a diazonium compound according to claim 1.

4. Diazotype material according to claim 3 wherein said diazonium compound is 4-dimethylamino-2-(1', 1', 2'-trifluoro-2'-chloro-ethoxy)-5-(4'-chloro-phenoxy)-benzene diazonium sulfate.

5. Diazotype material according to claim 3 wherein said diazonium compound is 4-dimethylamino-2-(1', 1'-difluoro-2', 2'-dichloro-ethoxy)-5-(4'-chloro-phenxoy)-benzene diazonium sulfate.

6. Diazotype material according to claim 3 wherein said diazonium compound is 4-dimethylamino-2-(1', 1', 2'-trifluoro-2'-chloro-ethoxy)-5-(4'-methoxy-phenoxy)-benzene diazonium sulfate.

7. Diazotype material according to claim 3 wherein said diazonium compound is 4-dimethylamino-2-(1', 1', 2'-trifluoro-2'-bromo-ethoxy)-5-(4'-chloro-phenoxy)-benzene diazonium chloride.

8. Diazotype material according to claim 3 wherein said diazonium compound is 4-diethylamino-2-(1', 1', 2'-trifluoro-2'-chloro-ethoxy)-5-(4'-chloro-phenoxy)-benzene diazonium chloride.

* * * * *